United States Patent
Trantoul et al.

(10) Patent No.: US 7,360,712 B2
(45) Date of Patent: Apr. 22, 2008

(54) METHOD AND DEVICE FOR PROTECTING TEXT FOR READING

(75) Inventors: Francois Trantoul, 1312 Chemin du Pont des Anes, Lunel (FR) 34400; Didier Serra, Les Pennes Mirabau (FR); Eric Jouve, Trets (FR); Pierre Pic, La Ciotat (FR); Jean-Yves Leroy, Restinclieres (FR)

(73) Assignees: Francois Trantoul, Lunel (FR); Fasver SA, Baillarguess (FR); Inside Contactless, Aix en Provence Cedex (FR)

( * ) Notice: Subject to any disclaimer, the term of this patent is extended or adjusted under 35 U.S.C. 154(b) by 572 days.

(21) Appl. No.: 10/515,719

(22) PCT Filed: May 27, 2003

(86) PCT No.: PCT/FR03/01602

§ 371 (c)(1),
(2), (4) Date: Nov. 26, 2004

(87) PCT Pub. No.: WO03/100721

PCT Pub. Date: Dec. 4, 2003

(65) Prior Publication Data

US 2005/0230966 A1    Oct. 20, 2005

(30) Foreign Application Priority Data

May 29, 2002 (FR) .................................. 02 06559

(51) Int. Cl.
*G06K 19/06* (2006.01)

(52) U.S. Cl. ...................... 235/492; 235/380; 235/382; 235/487; 340/572.1; 343/742

(58) Field of Classification Search ................ 235/492, 235/451, 487, 380, 382; 340/572.1, 5.2; 343/742
See application file for complete search history.

(56) References Cited

U.S. PATENT DOCUMENTS

| | | | |
|---|---|---|---|
| 5,232,527 A | 8/1993 | Vernhet et al. | |
| 5,347,263 A * | 9/1994 | Carroll et al. | ............. 340/5.61 |
| 5,955,723 A | 9/1999 | Reiner | |
| 7,121,472 B2 * | 10/2006 | Shimizu et al. | ............. 235/492 |
| 7,143,953 B2 * | 12/2006 | Takahashi et al. | ........... 235/494 |
| 7,182,266 B2 * | 2/2007 | Yoshinaga et al. | .......... 235/492 |
| 2003/0183695 A1 * | 10/2003 | Labrec et al. | ................ 235/487 |

FOREIGN PATENT DOCUMENTS

| | | |
|---|---|---|
| EP | 0 271 941 | 6/1988 |
| EP | 0 593 111 | 4/1994 |

(Continued)

*Primary Examiner*—Seung Ho Lee
(74) *Attorney, Agent, or Firm*—Young & Thompson

(57) ABSTRACT

A method and a device for protecting text for reading (23), arranged on at least one written face (22) of an object (25). The object (25) is connected to at least one matching antenna (12), produced by printing on a support (11) and having at least one electromagnetic coupling zone (14) with an individual antenna of smaller dimensions. At least one security film (3), not provided with a matching antenna (12) but with at least one individual integrated antenna microcircuit called a microtransponder (7), is applied to cover the text for reading (23) for which authentication information may be delivered using the microtransponder (7).

44 Claims, 10 Drawing Sheets

FOREIGN PATENT DOCUMENTS

Figure 1:
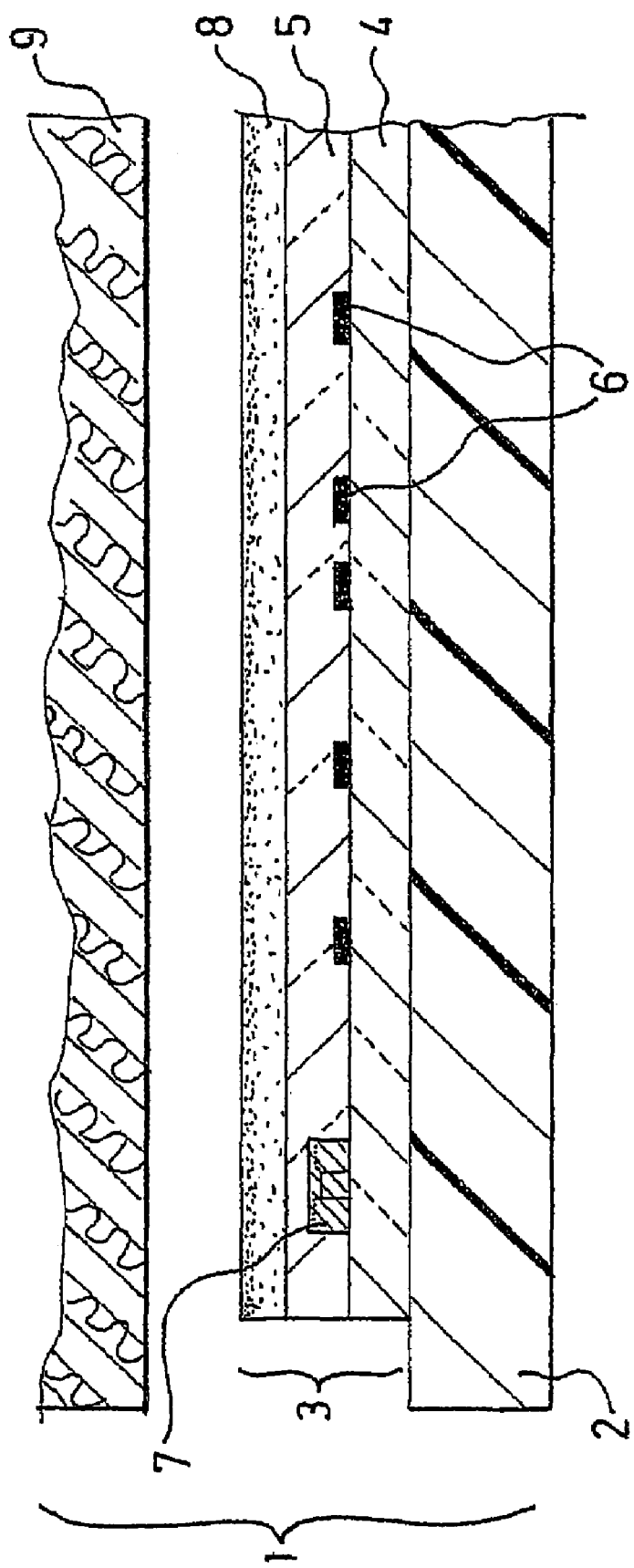

| | | |
|---|---|---|
| EP | 0 602 713 | 6/1994 |
| EP | 0 826 190 | 3/1998 |
| EP | 0 977 145 | 2/2000 |
| FR | 2 793 726 | 11/2000 |
| FR | 2 812 482 | 2/2002 |
| WO | WO 02/21436 | 3/2002 |

* cited by examiner

METHOD AND DEVICE FOR PROTECTING TEXT FOR READING

BACKGROUND OF THE INVENTION

1. Field of the Invention

The invention relates to the protection of readable script formed on a face of an object such as an official document.

2. Description of the Related Art

In many applications, it is necessary for script formed earlier on objects to be protected against forgery and/or for the purpose of authentication and/or in order to guarantee its integrity.

One known solution (for example EP-0271941 or U.S. Pat. No. 5,232,527) consists in covering the readable script with a transparent film (that is to say a film making it possible to read the script that it covers) which adheres to the object and has a free outer face after having been placed on the object.

The object may, for example, be an official document (passport, visa, identity card, driver's license, bank card, access control card, passes, tags, judicial document, survey map, manufacturing schematic or other diagram, etc.) bearing readable script such as variable records (name, first name, address, photograph, etc. of a bearer or of the parties, etc.) and/or common records (security designs, registers, lists, field names, seals, holograms, etc.) to be protected against forgery and/or for the purpose of authentication and/or in order to guarantee its integrity (that is to say that it has not been tampered with or modified). The object may also be packaging, a product or article of any type bearing readable script which needs to be protected, such as text, a logo, drawing, photograph, serial number, etc.

Throughout the text, the term "readable script" will be used to mean any sign or pattern formed on the document, which can be read by a person at least under certain conditions (in particular under normal illumination with visible light; and/or under specific illumination; and/or after activating an electronic device (screen) or the like, etc.) which may be at least partially represented by recordable digital data. This may involve text (handwriting or printed characters); codes (ASCII, universal optoelectronically read codes such as barcodes, etc.); images or photographs, etc.

Integrated circuit memory devices (chips) are furthermore known which have a contactless information transmission link, in particular for reading, making it possible to associate personalized information securely with objects such as bank cards, electronic passes, electronic tags, etc. WO 02/21436 envisages the integration of a contactless chip with a document for identifying a physical individual, in particular when the document is being personalized, for example by integrating it in a security film or sandwiching it between laminated layers of the document. This document does not indicate how such a chip can be produced and does not explain how this contactless chip could in practice be integrated with a security film. Moreover in view of the thickness of such a chip, the problems linked to electrical connection of the integrated circuit with the associated antenna(s) and the prohibitive size of the antenna needed in order to obtain coupling with a reader at a sufficient range with respect to the space available on the document, the cited variant of integration with a security film is not practically viable in the light of this document.

Sandwiched incorporation of the chip between two sheets of the document is also expensive and poses practical manufacturing problems. There is in particular a risk that such a chip, which is relatively fragile, will not withstand the process of printing the personalization script. If it is associated with the document after this printing, such association is complex and not very reliable.

In any event, a chip incorporated with a document by sandwiching is physically disassociated from the readable script, so that tampering with the chip and with the readable script may be carried out independently.

It should also be noted that if a contactless chip and its antenna have small dimensions, this entails a short reading range. It is furthermore necessary to place the chip very precisely with respect to a reading device—in particular with respect to the axis of the antenna of this reading device.

Furthermore, FR-2 812 482 or EP-0826190 describe contactless devices having chip(s) with magnetic coupling between two antennas, one of which is an antenna coil electrically connected to the integrated circuit of the chip—in particular of the "coil on chip" type—and one is a passive antenna coil of larger dimensions, making it possible to increase the reading range of the chip with less bulk. The two antennas may be magnetically coupled by means of a coupling loop which is formed by the large coil, and whose dimensions correspond to those of the small coil. FR-2 812 482 mentions that the large coil may be incorporated in the thickness of the cover of a booklet, each page of which holds one or more contactless micromodule(s) (chip with its integrated antenna (small coil)) fixed on a plastic sheet arranged in a booklet. These devices do not provide a solution to the problem of protecting readable script effectively, in particular against forgery and/or for the purpose of authentication and/or in order to guarantee its integrity. In particular, the chips themselves are unprotected and may be corrupted or even replaced by a forger. Placing them on each page of the booklet is expensive and complicated, especially if coupling of the type described by EP-0826190 is envisaged. Furthermore, incorporating an antenna with large dimensions in the thickness of the cover is expensive and, since it makes this antenna invisible, does not allow precise subsequent positioning of each chip with respect to this antenna. Yet this precise positioning is indispensable in order to obtain sufficient magnetic coupling.

It should also be noted that the solution described in FR-2 812 482 does not in practice offer effective coupling of each individual antenna with the group antenna.

The prior art thus does not provide an economical, simple and reliable solution, compatible with practical implementation on an industrial scale, which makes it possible for an electronic memory device having microcircuit(s) with contactless reading, referred to as a contactless chip, to be associated effectively with an object bearing readable script, with a view to protecting this readable script.

BRIEF SUMMARY OF THE INVENTION

It is a general object of the present invention to resolve this problem.

More particularly, it is an object of the invention to prevent the risk of the contactless chip masking the readable script, and to offer a sufficient reading range of the contactless chip—in particular of the order of several centimeters—and a low lateral positioning precision of the object and the contactless chip with respect to a reading device—in particular of the order of several millimeters or even several centimeters.

It is also an object of the invention to provide protection of the script in which a contactless chip is combined with a transparent protective film, insofar as the contactless chip reinforces the protection provided by the film and the security film reinforces the protection provided by the contactless chip. In this regard, it is more particularly an object of the invention to permit the effective incorporation of a contactless chip in a transparent protective film, in particular as described in EP-0271941 or U.S. Pat. No. 5,232,527, with this film protecting the chip itself, and the use of this combination for the protection of readable script.

More particularly, it is an object of the invention to obtain such protection by implementing only simple steps of adhesively bonding film(s) and/or printing, in particular without the need to incorporate an element within a thickness of paper or card, or sandwiched between two sheets of paper or card.

It is also an object of the invention to permit simple and rapid implementation of the protection method, in particular so that precise positioning of the various elements is readily obtained without complex technology.

In this regard, it is in particular an object of the invention to provide protection which can be used by local administrations for issuing official documents (for example identity cards, passports, driver's licenses, visas, etc.) or during the industrial manufacture of packaging, products or articles, without requiring the use of complex, heavy and expensive equipment.

Throughout the text, the term "antenna" generally denotes any electrically conductive line making it possible to produce electromagnetic—especially inductive and/or magnetic—coupling with another electromagnetic device. The term "electromagnetic coupling" denotes any form of remote coupling by means of electric and/or magnetic and/or electromagnetic field(s). Furthermore, the term "microcircuit" denotes any device with a size of less than 5 mm×5 mm×5 mm forming an electronic circuit, which is produced essentially according to integrated circuit technologies. It may in particular be a chip with a memory (ROM, RAM, EPROM, flash, etc.) and/or with a microprocessor and/or with hardwired logic, optionally provided with other non-electronic or secondary functions (antenna), or a plurality of chips associated in order to form such a device.

The invention therefore relates to a method for protecting readable script formed on at least one face of an object, referred to as a scripted face, in which readable script on at least one scripted face of the object is covered with a transparent protective film referred to as a security film, which adheres to this scripted face, and the object is associated with at least one microcircuit having at least one antenna for contactless remote reading of authenticating information, which can be delivered by this microcircuit and is designed to permit authentication of at least some of the readable script, wherein:
the object is associated with at least one antenna referred to as a matching antenna, formed by printing on a support, this matching antenna having at least one zone for electromagnetic coupling with an individual antenna whose dimensions are smaller than those of the matching antenna,
at least one film referred to as a security film is used, which does not carry a matching antenna but carries at least one microcircuit with an integrated individual antenna, referred to as a microtransponder, at a predetermined position so that after the security film has been placed on a scripted face of the object, and for at least one position or state of the object:
it permits electromagnetic coupling of the individual antenna with an electromagnetic coupling zone of a matching antenna associated with the object,
it does not mask any essential part of the readable script,
a security film is applied and adhered to a corresponding scripted face in order to cover readable script and so as to permit electromagnetic coupling of the individual antenna of each microtransponder with a coupling zone of a matching antenna, for at least one position or state of the object, the matching antenna having dimensions designed to permit the remote transmission of information between the individual antenna and a power antenna of a reading device when the object is placed in the field of this power antenna.

The invention extends to a device for carrying out a method according to the invention. The invention therefore relates to a device for protecting readable script formed on at least one face of an object, referred to as a scripted face, comprising:
at least one transparent protective film referred to as a security film, which is intended to adhere to a scripted face while covering readable script, and
at least one microcircuit intended to be associated with the object, having at least one antenna for contactless remote reading of authenticating information, which can be delivered by the microcircuit and is designed to permit authentication of at least some of the readable script,
which comprises:
at least one antenna intended to be associated with the object, referred to as a matching antenna, formed by printing on a support and having at least one zone for electromagnetic coupling with an individual antenna whose dimensions are smaller than those of the matching antenna,
at least one film referred to as a security film, which does not carry a matching antenna but carries at least one memory microcircuit with an integrated individual antenna, referred to as a microtransponder, at a predetermined position so that after the security film has been placed on a scripted face of the object, and for at least one position or state of the object:
it permits electromagnetic coupling of the individual antenna with an electromagnetic coupling zone of a matching antenna associated with the object,
it does not mask any essential part of the readable script,
and wherein the matching antenna has dimensions designed to permit the remote transmission of information between the individual antenna and a power antenna of a reading device when the object is placed in the field of this power antenna.

The coupling zone and the individual antenna have similar dimensions, corresponding at least substantially to the script or smaller than this script, so that the individual antenna does not mask the script. Advantageously and according to the invention, the area of a coupling zone of an individual antenna and of a microtransponder is less than 10 $mm^2$. The coupling zone is thus much smaller than the matching antenna, the dimensions of which may correspond at least substantially to those of the size of the object.

The electromagnetic coupling should occur for at least one position or state of the object, in which the relative positions of the coupling zone of the matching antenna and the individual antenna are such that the electromagnetic coupling takes place. In particular, advantageously and according to the invention, the matching antenna and the security film are in relative positions designed so that the coupling zone located on the matching antenna faces the individual antenna. It may be that the electromagnetic coupling does not take place in certain positions of the object or in certain states of the object. In the case of an object formed by a booklet, a book or a plurality of sheets, for example, the electromagnetic coupling may be obtained only when the sheets or pages are against one another, that is to say when the booklet or pamphlet is closed.

Being carried by a security film, each microtransponder is definitively protected by this security film, on the one hand from mechanical harm and on the other hand from attempted forgery. In particular, since the security film is necessarily put on after the readable script has been formed, the microtransponder(s) is/are not subjected to the steps of printing the script.

It should be noted that in contrast to that which WO 02/21436 provides, the electromagnetic memory device for the recording of authenticating information in a method and a device according to the invention is not necessarily incorporated entirely in the security film which covers the readable script. In particular, the matching antenna which makes it possible in practice to obtain a suitable reading range and a sufficiently small lateral positioning precision is printed on a support and is not incorporated in a thickness of a cover of the object, made of a sheet of paper or card. Also, since each microtransponder is precisely placed with respect to a security film, a simply precise placement of the security film on the object (a traditional operation which is easy to carry out, even manually) makes it possible to ensure precise relative positioning of each individual antenna of this security film with respect to a coupling zone of the matching antenna. This simple fact leads to great ease of manufacture and use.

The (individual and matching) antennas are designed to permit at least contactless reading. They may also permit contactless writing to the memory. As a variant, the writing may be carried out via another link, with or without contact.

With the invention, furthermore, a security film bearing at least one microtransponder and not a matching antenna covers the readable script for at least one scripted face of the object. This disassociation significantly reinforces the protection against forgery. It also makes it possible to protect a scripted face that does not have enough free space to incorporate a matching antenna.

Advantageously and according to the invention, at least one matching antenna is printed on a face of the object which may or may not be a scripted face in the context of the invention, that is to say one which bears readable script needing to be protected by the recording of corresponding information in a microtransponder. After printing the printed matching antenna, advantageously and according to the invention it is subsequently covered with a protective film, in particular a security film if the matching antenna is printed on a scripted face.

In a preferred variant, advantageously and according to the invention, at least one matching antenna is printed on or in (incorporated between a plurality of layers of) a film of synthetic material referred to as an antenna film, and is carried by this antenna film. The antenna film is adhered to a face of the object.

This antenna film may be a security film carrying at least one microtransponder, which may be connected to the matching antenna, with the overall circuit that is formed fulfilling both functions (at least one other security film without a matching antenna is then provided). The matching antenna may also constitute a main antenna for a microtransponder, to which it is electrically connected; and act as a matching antenna for one or more microtransponder(s) associated with one or more security film(s) separate from the antenna film. As a variant, the antenna film is not a security film (that is to say it does not have a microtransponder). Thus, advantageously and according to the invention, the matching antenna in this variant is printed on a printing support which is not a security film carrying at least one microtransponder.

Advantageously and according to the invention, the antenna film is applied and adhered to a face of the object which is not a scripted face—in particular to a face of the object which is the verso of a sheet of the object whose recto is a scripted face. By virtue of the invention, therefore, the readable script is protected on the recto of a sheet which carries it by a security film carrying at least one microtransponder, and on the verso of this film by an antenna film which, like the security film, may also be a thin film for protection against attempted forgery. The security film and/or the antenna film advantageously incorporate(s) means which reinforce the protection against attempted forgery and/or authentication (photoluminescent patterns, soluble inks, patterns whose appearance varies depending on the direction of illumination and/or reading, holograms, antiphotocopy patterns, weakened areas, differential adhesion of a plurality of layers in contact, etc.). Attempted forgery either through the recto or through the verso of the sheet is therefore bound to fail.

Moreover, advantageously and according to the invention, at least one matching antenna is printed with an ink which is transparent to visible light and electrically conductive after drying. For example, a transparent ink composition is used which incorporates at least one transparent electrically conductive polymer compound such as a polythiophene—in particular a PEDT/PSS mixture. In this way, the matching antenna is invisible or not very visible, and it may be associated overlapping with readable script on the object. As a variant or in combination, at least some of a matching antenna may form a pattern that itself constitutes one (or more) readable scripts. In this way, this pattern formed by the matching antenna cannot be distinguished from the readable script lying underneath.

Furthermore, advantageously and according to the invention, at least one transfer referred to as an antenna transfer is used, comprising a support sheet carrying an adhesive antenna film, this antenna transfer being designed to make it possible to apply and adhere the antenna film to a face of the object by separating the antenna film from the support sheet. Advantageously and according to the invention, such an antenna transfer is a cold dry transfer (the adhesive being of the type sensitive to pressure when cold, that is to say at room temperature) or, as a variant, a hot transfer (the adhesive being of the heat sensitive type). Such transfers can be used in a straightforward and well-controlled way.

Advantageously and according to the invention, at least one matching antenna forms a resonant electrical circuit comprising an inductor and an electrical capacitor. Advantageously and according to the invention, at least one matching antenna comprises an electrical capacitor of adjustable value. This value can be adjusted before placement, for example, so as to make it possible to obtain a good match of the matching antenna to each associated microtransponder, and to do so with just one type of matching antenna. For instance, the matching antenna may be produced in a standardized form and is tuned during use in a way which may be predefined, according to the number of associated microtransponder(s) and the nature of each associated microtransponder.

Since the matching antenna is printed, the same will be true of this capacitor formed by two conductive layers printed facing each other in order to form two capacitor plates separated by a printed insulator layer, at least one of the plates being in the shape of a comb whose teeth can be cut, for example by scratching, so as to modify its active area. The value of the electrical capacitor can thus be determined and tuned before the power antenna is produced. Furthermore, this electrical capacitor may also be incorporated in a graphic pattern of the antenna film and/or of the object, or superimposed with such a pattern, so that it is difficult to detect.

Furthermore, advantageously and according to the invention, at least one matching antenna is printed by silkscreen printing.

Advantageously and according to the invention, at least one given matching antenna is used comprising a plurality of electromagnetic coupling zones for coupling it with a plurality of individual antennas of a plurality of microtransponders belonging to the same security film or to a plurality of security films associated with different scripted faces. Advantageously and according to the invention, a plurality of security films each comprising at least one—in particular a single—microtransponder is used for the protection of readable script on a plurality of scripted faces of the object. Advantageously and according to the invention, a single matching antenna is used for the object. For example, a single matching antenna may be provided for the protection of an official document such as a passport in the form of a booklet or pamphlet.

Moreover, advantageously and according to the invention, at least one security film comprising at least one microtransponder incorporated in its thickness is used. Advantageously and according to the invention, at least one multilayered security film is used. Advantageously and according to the invention, at least one security film formed by printing is used, incorporating at least one microtransponder in the thickness of the security film when the security film is being formed by printing, between two printed layers. The microtransponder can thus be integrated between a plurality of varnish and/or adhesive layers of the security film. Advantageously and according to the invention, at least one security film formed by silkscreen printing is used.

Advantageously and according to the invention, each microtransponder incorporated with a security film has a thickness of less than 0.2 mm and an area of less than 10 mm$^2$ in the plane of the security film. Advantageously and according to the invention, each microtransponder incorporated in a security film has a thickness of between 50μ and 180μ.

Furthermore, advantageously and according to the invention, at least one transfer referred to as a protection transfer is used, comprising a support sheet carrying an adhesive security film, this protection transfer being designed to make it possible to apply and adhere the security film to a scripted face of the object by separating the security film from the support sheet. Advantageously and according to the invention, such a protection transfer is a cold dry transfer or, as a variant, a hot transfer.

Moreover, advantageously and according to the inventon, information for authenticating at least some of the readable script is recorded—especially in an encrypted form—in at least one memory of at least one microtransponder carried by at least one security film covering readable script. As a variant or in combination, advantageously and according to the invention, at least authenticating information which represents a key and/or an algorithm for authentication and/or a certificate resulting from an algorithm is recorded in at least one memory of at least one microtransponder. This recording is carried out in an irreversible form, that is to say it is not subsequently possible to erase or modify the recorded information. This recording may take place before or after the security film and/or the matching antenna is placed on the object. As a variant or in combination, advantageously and according to the invention, at least one microtransponder forming a logic circuit is used.

The invention also relates to a device which comprises at least one matching antenna and/or at least one antenna transfer and/or at least one security film and/or at least one protection transfer as mentioned above.

The invention extends to an object comprising readable script protected by a method according to the invention and/or with a device according to the invention. The invention therefore relates to an object comprising at least one face referred to as a scripted face on which readable script is formed, which comprises:

at least one matching antenna formed by printing on a support and associated with the object, this matching antenna having at least one zone for electromagnetic coupling with an individual antenna whose dimensions are smaller than those of the matching antenna, at least one security film which does not carry a matching antenna but carries at least one microcircuit and with an integrated individual antenna, referred to as a microtransponder, the security film being applied and adhering to a scripted face in order to cover readable script, the position of each microtransponder being designed so as to permit electromagnetic coupling of the individual antenna of each microtransponder with a coupling zone of a matching antenna, for at least one position or state of the object, the matching antenna having dimensions designed to permit the remote transmission of information between the individual antenna and a power antenna of a reading device when the object is placed in the field of this power antenna, and wherein at least one microtransponder of a security film covering readable script is designed to be able to deliver information for authenticating at least some of this readable script.

The invention also relates to a method, a device and an object which in combination have some or all of the features mentioned above or below.

BRIEF DESCRIPTION OF THE DRAWING FIGURES

Figure 2:
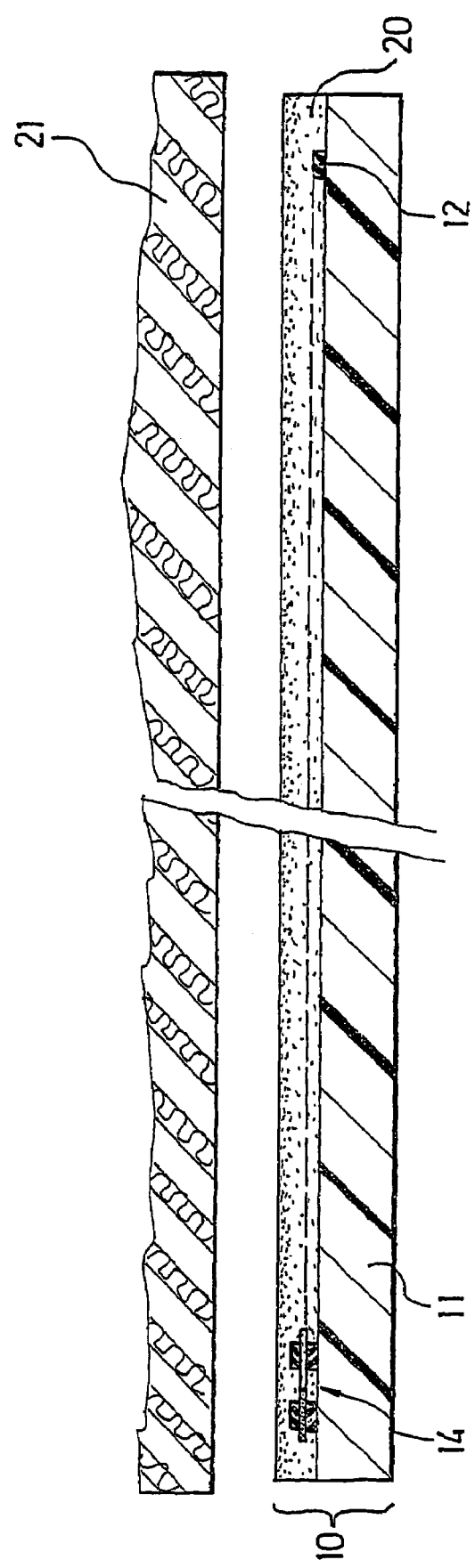
Figure 3:
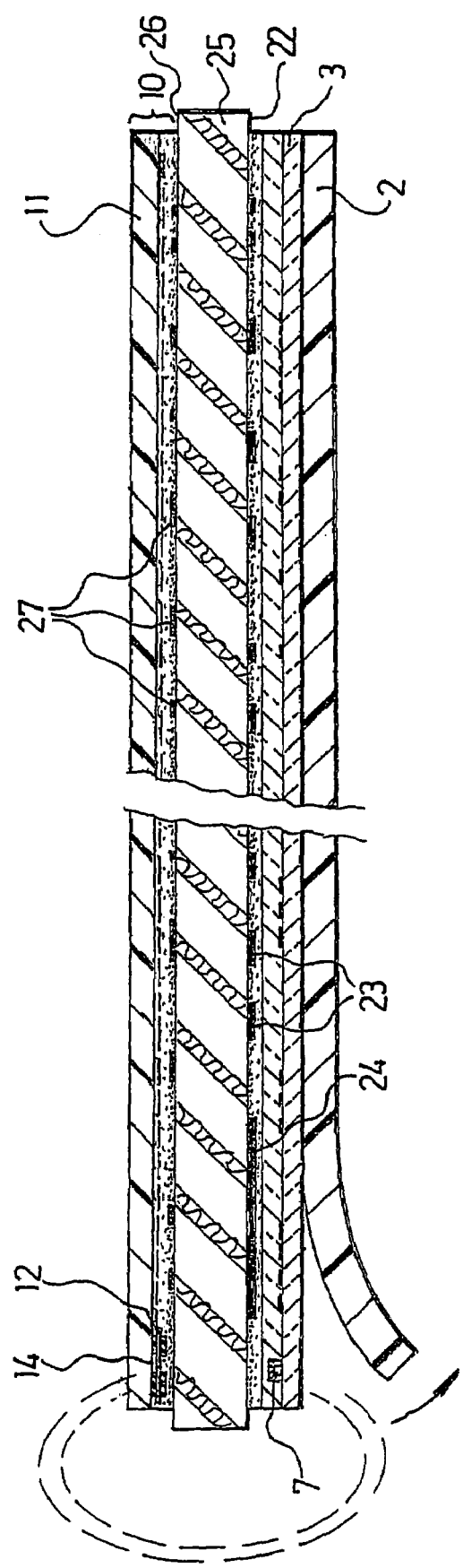
Figure 4:
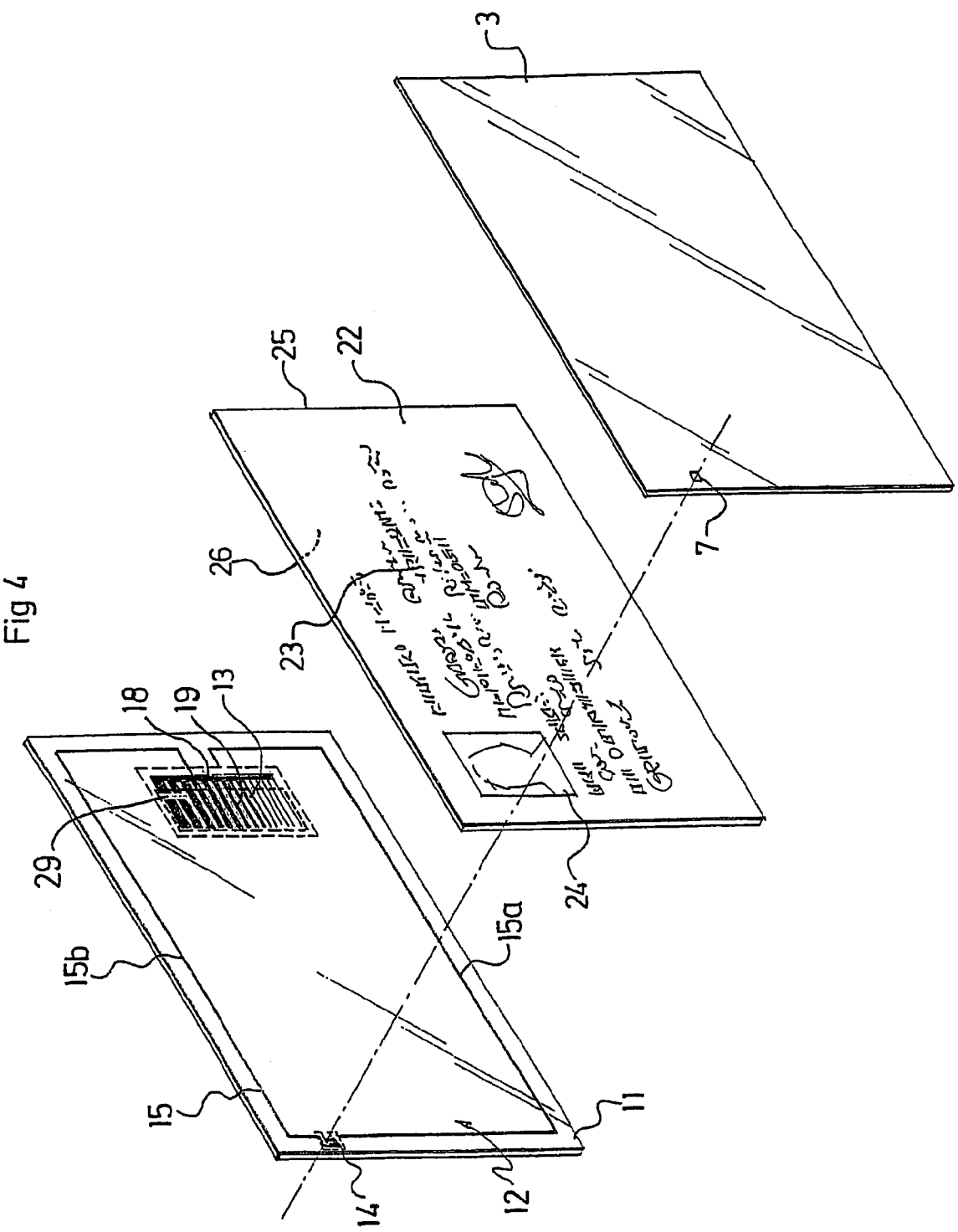
Figure 5:
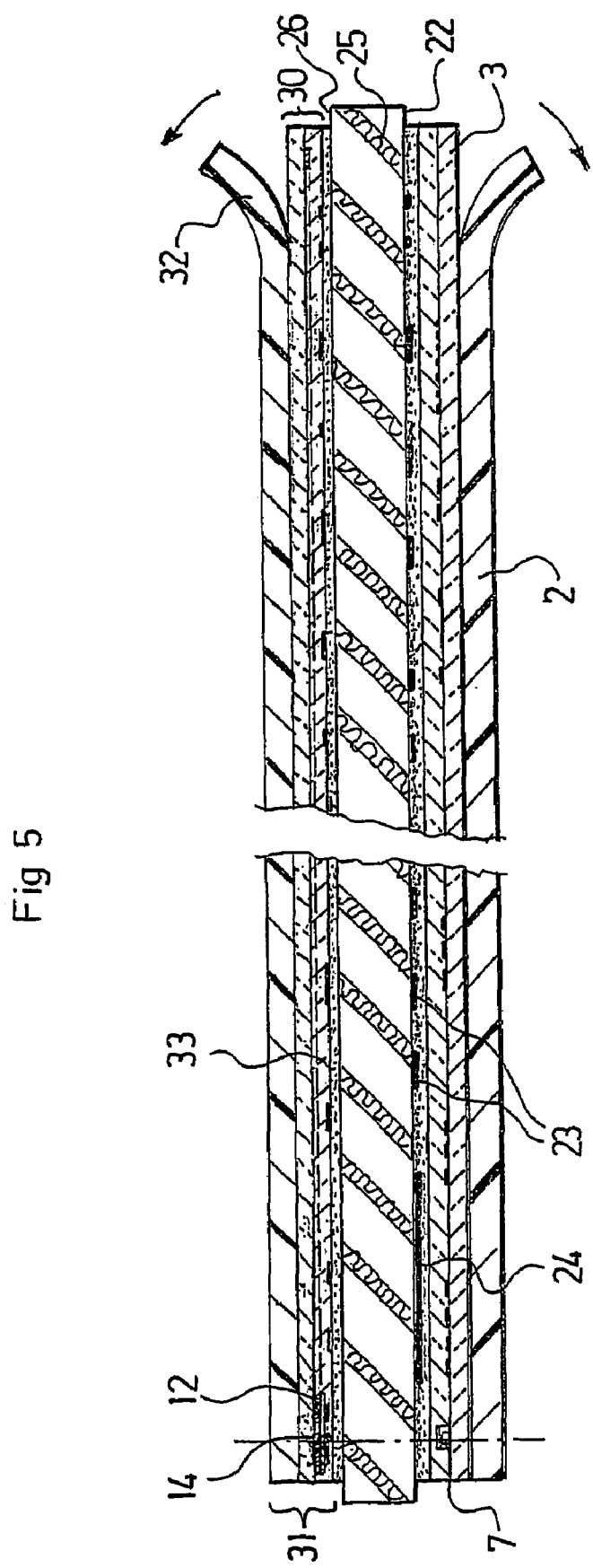
Figure 6:
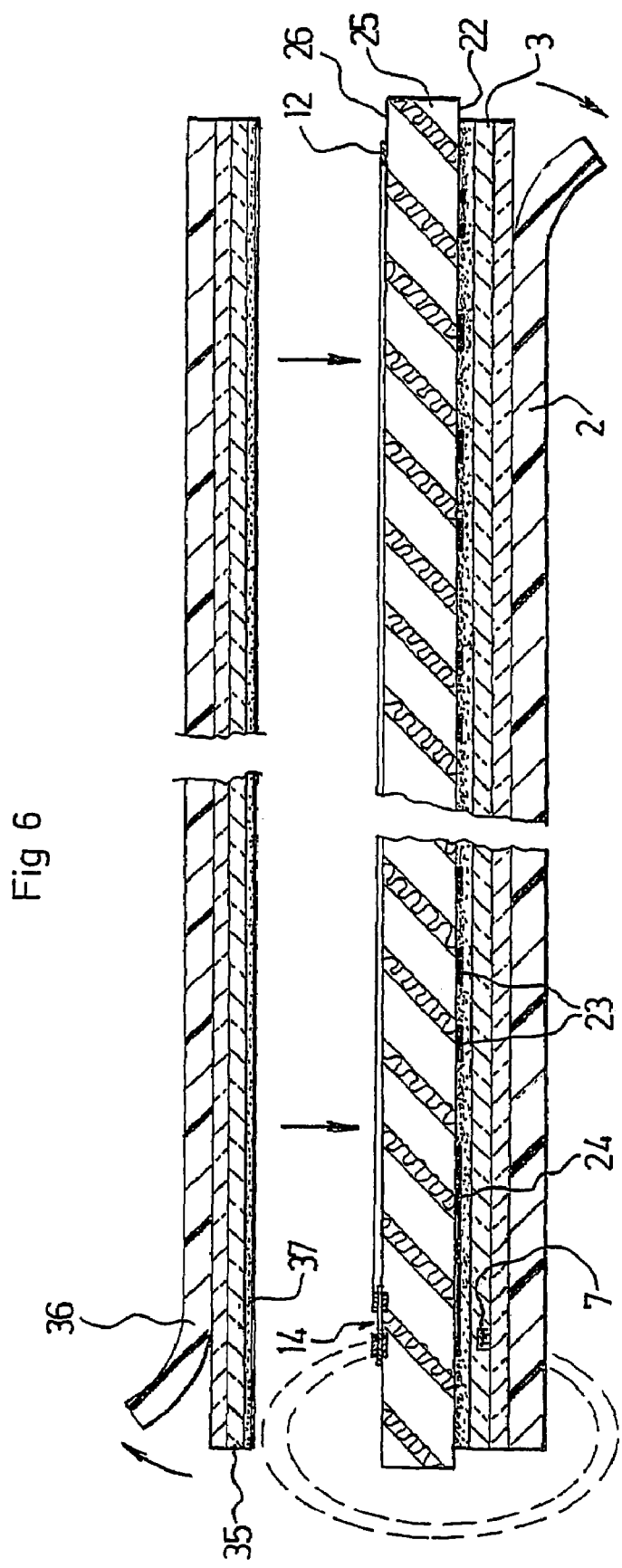
Figure 7:
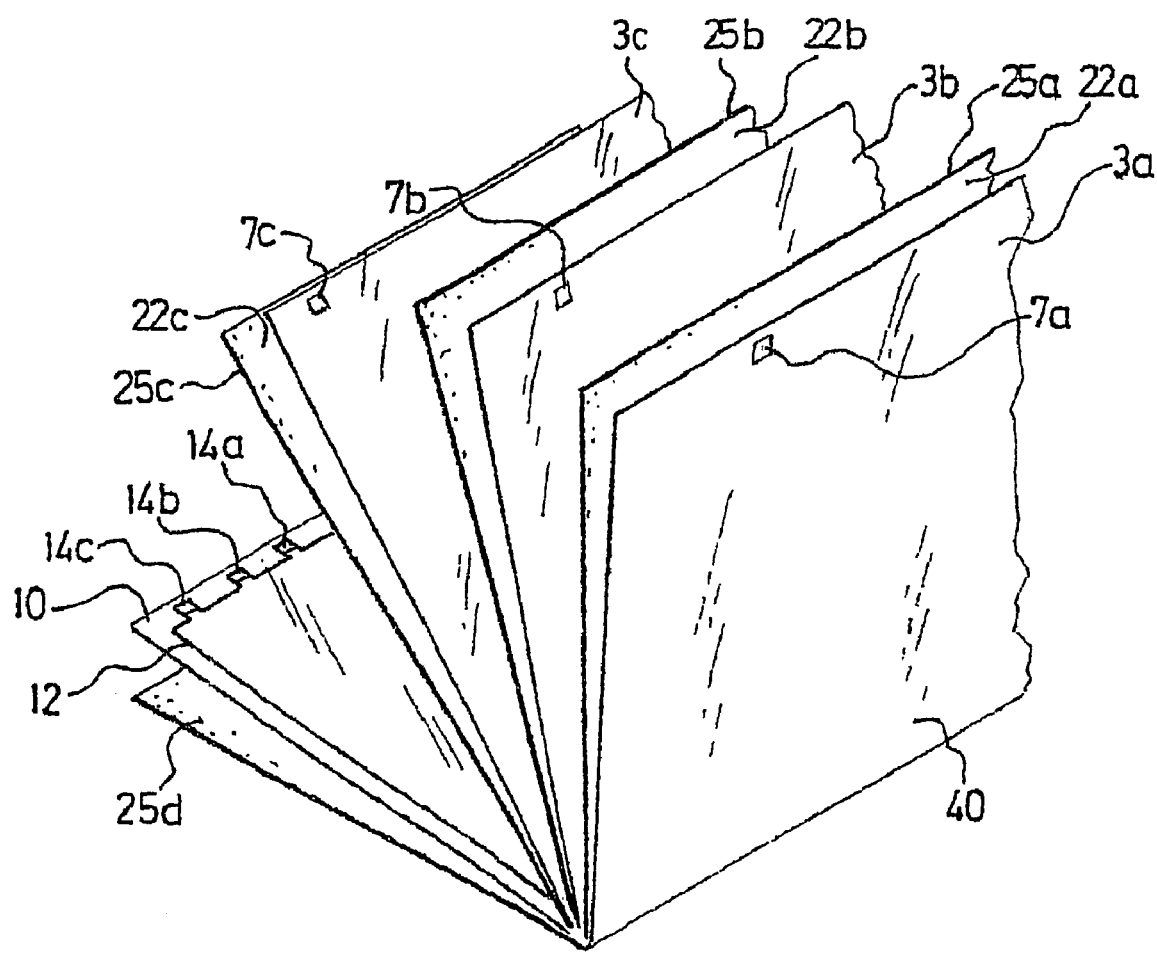
Figure 8:
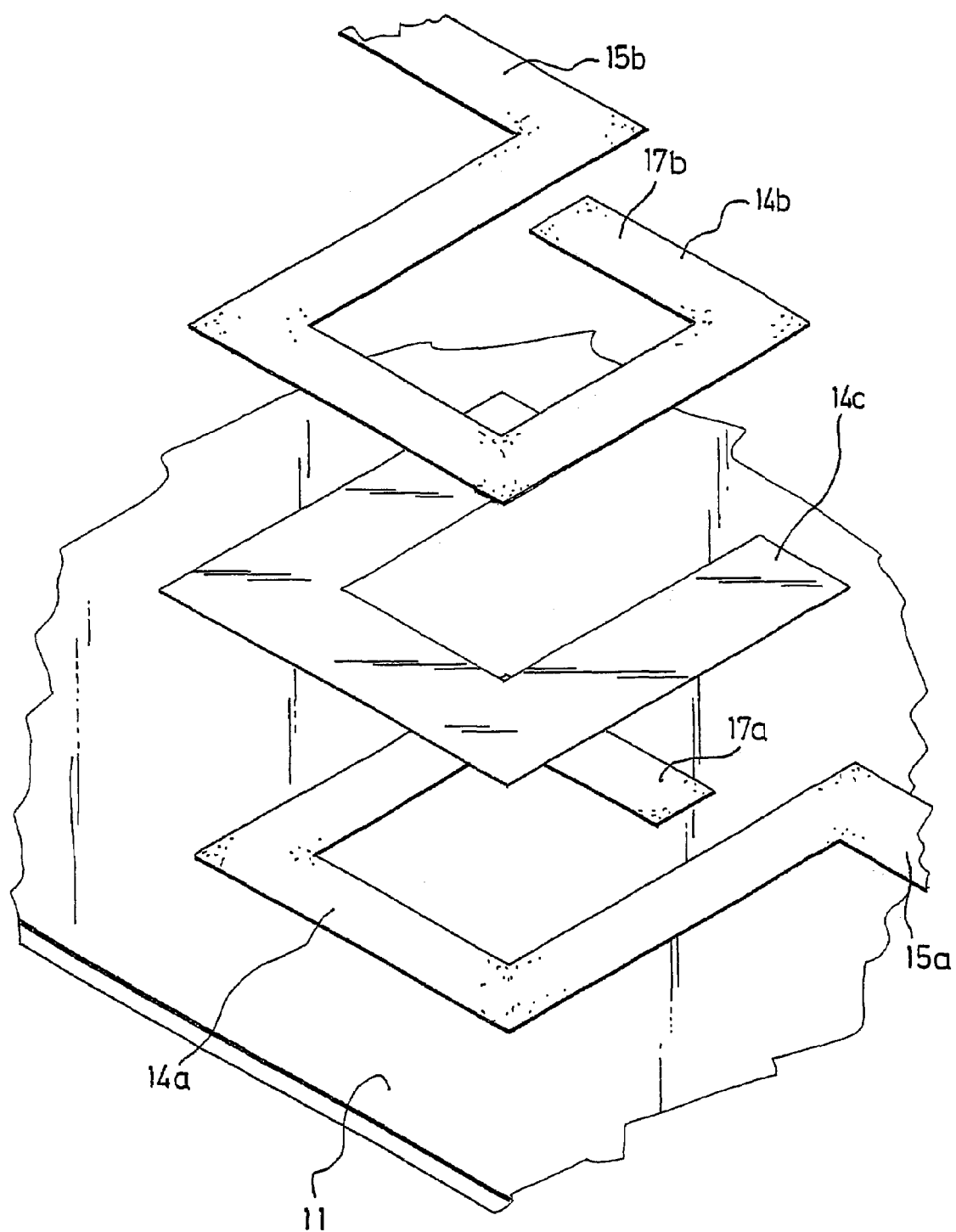
Figure 9:
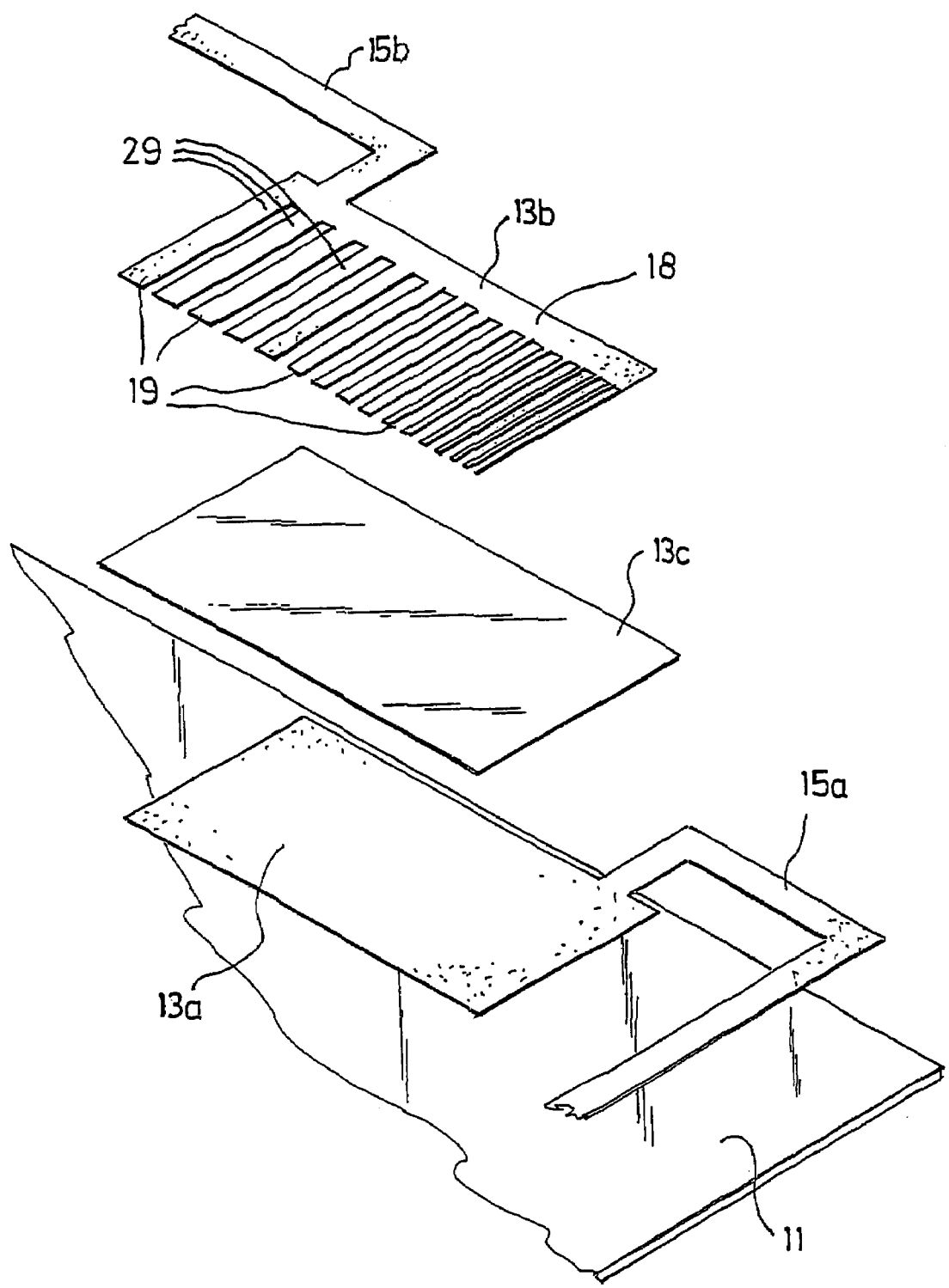
Figure 10:
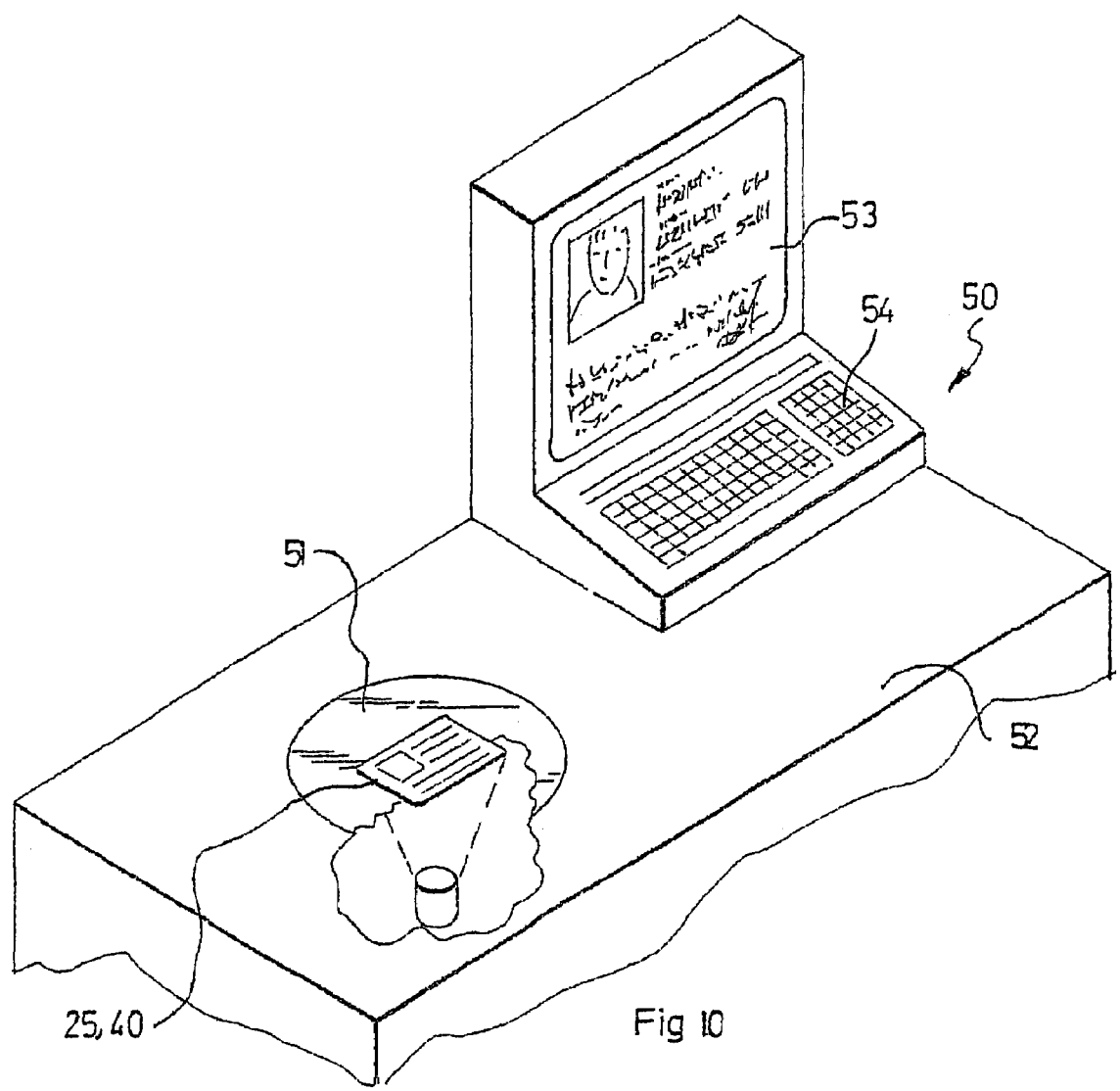

Other objects, features and advantages of the invention will become apparent on reading the following description, referring to the appended figures which represent nonlimiting exemplary embodiments of the invention and in which:

FIG. 1 is a schematic sectional view of a protection transfer of a device according to the invention, FIG. 2 is a schematic sectional view of an antenna film of a device according to the invention, FIG. 3 is a schematic sectional view illustrating a method according to the invention for protecting a sheet of a document with the aid of the protection transfer in FIG. 1 and the antenna film in FIG. 2, FIG. 4 is a schematic exploded perspective view of the protected sheet obtained by the method according to the invention corresponding to FIG. 3, FIGS. 5 and 6 are similar views to FIG. 3, respectively illustrating two alternative embodiments of the invention, FIG. 7 is a schematic perspective view of a document, such as a passport, protected by a method according to the invention, FIG. 8 is a schematic perspective view of an embodiment detail of an electromagnetic coupling zone of a matching antenna of a device according to the invention, FIG. 9 is a schematic perspective view of an embodiment detail of an adjustable capacitor of a matching antenna of a device according to the invention, FIG. 10 is a schematic perspective view illustrating the use of a document protected according to the invention.

DETAILED DESCRIPTION OF THE PREFERRED EMBODIMENTS

In the figures, the thicknesses have been exaggeratedly enlarged for illustration purposes.

The protection transfer 1 represented in FIG. 1 comprises a support sheet 2 on which a transparent adhesive security film 3 is printed. In the example which is represented, this security film 3 comprises two continuous printed polyurethane layers 4, 5 (in the format of the security film 3 formed in this way) between which at least one security pattern 6 is printed. The security film 3 is a multilayered film which may be produced, for example as described in EP 0271941 or U.S. Pat. No. 5,232,527, by successively printing layers whose composition polymerizes after printing. The support sheet 2 is made of polystyrene, for example, in order to permit subsequent separation of the security film 3 by transfer onto an object. The first polyurethane layer 4 is silkscreen-printed onto the support sheet 2. Before the end of the polymerization, the security pattern 6 is silkscreen-printed onto this first layer 4 then a memory microcircuit (chip) with an integrated antenna (that is to say of the "coil on chip" type) referred to as a microtransponder 7 is adhesively bonded. Still before the end of the polymerization of the first layer 4, the second continuous polyurethane layer 5 is silkscreen-printed. A continuous adhesive layer 8 which is an adhesive sensitive to cold pressure (self-adhesive) or a heat sensitive adhesive is subsequently printed, likewise by silkscreen printing. The adhesive is covered with a nonstick protective sheet 9, for example made of silicone paper.

The selected microtransponder 7 is for example an IC-LINK® PICOPASS® or IC-LINK® MICROPASS® chip marketed by INSIDE TECHNOLOGIES (FRANCE).

The microtransponder 7 whose overall thickness is more than that of the layers 4, 5 (in the figures, the thicknesses are not true to scale and the relative thicknesses are not represented realistically) may be covered with a thin film wafer, or may even be carried by a film wafer in the manner of a tag, equipped with reference markers in order to make it easier to place it on the first layer 4 then form the second layer 5.

After having positioned this microtransponder 7, the second polyurethane layer 5 and the adhesive layer 8 are printed using a flatbed silkscreen printing machine with a plane screen having a suitable value of angular or flat lift, making it possible to avoid friction of the squeegee and the screen as the microtransponder 7 passes. The use of a silkscreen printing technique thus makes it possible to avoid applying a pressure roller to the microtransponder 7. Notwithstanding, other printing techniques could also be used while taking care to avoid any damage to the microtransponder 7, either by exerting sufficiently small pressures or by providing the pressure members with gaps or recesses to accommodate the microtransponder 7.

FIG. 2 represents an antenna film 10, also formed by successive silkscreen printing on a support sheet 11, for example made of optionally transparent polyester.

A matching antenna 12 in the overall shape of a large loop 15 with large dimensions forming an electrical inductor, which is for example rectangular, that is to say a passive inductive antenna, is silkscreen-printed onto this support sheet 11. An electrically conductive ink composition is used, for example a conductive silver ink reference 5028 marketed by DUPONT DE NEMOURS (USA).

The matching antenna 12 also comprises an electrical capacitor 13. It thus constitutes a resonant circuit and may be referred to as a "resonator". The electrical capacitor 13 is formed by two layers 13a, 13b of conductive ink superimposed to form two facing plates separated by a layer 13c of insulating varnish. The matching antenna 12 also comprises at least one loop 14 for electromagnetic coupling with an antenna of a microtransponder 7. This electromagnetic coupling loop 14 has small dimensions, much less than those of the large loop 15 formed by the matching antenna 12 and corresponding to those of the integrated antenna of a microtransponder 7. It is formed by a small square turn produced on a branch or in a vertex of the large loop 15.

FIGS. 8 and 9 respectively illustrate an embodiment of an electromagnetic coupling loop 14 and an electrical capacitor 13. A lower first track of conductive ink is printed first, forming a half 15a of the large loop 15, an open square lower loop 14a of the coupling loop 14 and a lower plate 13a of this capacitor. An electrically insulating varnish composition is then printed, for example a cutting base reference UVIPRIM CV marketed by TIFLEX (FRANCE) forming an insulator 14c of the coupling loop 14, partially covering the open lower loop 14a apart from its end portion 17a; and a layer 13c of insulator covering the plate 13a of the capacitor 13. An upper second track of conductive ink is then printed, forming the second half 15b of the large loop 15, an open square upper loop 14b of the coupling loop 14, superimposed with the lower loop 14a and with the insulator 14c, the end part 17b of this upper loop 14 being electrically connected to the end part 17a of the lower loop 14a. The upper second track also forms an upper plate 13b of the capacitor 13, superimposed with the lower plate 13a via the layer 13c of insulator. The upper plate 13b is preferably in the shape of a comb, that is to say it has parallel teeth 19 of similar or different widths extending from a common longitudinal strip 18 and capable of being insulated from this strip 18 after the matching antenna 12 is printed, by scratching their initial portion connecting to this strip 18. FIG. 4 represents two teeth 19 whose initial portions 29 have been scratched, so that these two teeth are separated from the upper plate 13b. It is thus possible to adjust the value of the electrical capacitor 13 formed between the plates 13a, 13b.

A continuous layer of adhesive 20 is printed over the matching antenna 12, and this may be covered with a nonstick sheet 21 such as silicone paper. In order to make it possible to adjust the capacitor 13 by scratching at the time of use, an opening (not shown in the figures) may be formed through the adhesive 20 in order to make it possible to access the initial portions of the teeth 19 of the upper plate 13b and scratch them. In the example which is represented, the large loop 15 of the matching antenna 12 forms a closed electrical circuit having a single turn. As a variant (not shown) the large loop 15 of the matching antenna 12 may comprise a plurality of turns, either juxtaposed in the same plane, wound in one another or superimposed with one another via layers of insulating varnish, or juxtaposed, wound and superimposed. This increases the value of its electrical inductance. Likewise, the coupling loop 14 may be formed by a plurality of juxtaposed, wound and/or superimposed turns. The number of turns of the large loop 15 is not necessarily the same as that of the coupling loop 14. The electrical capacitor 13 may also comprise more than one pair of plates 13a, 13b connected in series (superimposed) or in parallel (juxtaposed).

In any event, an antenna sheet 10 (support sheet 11, matching antenna 12 and adhesive 20) covered with a nonstick sheet 21 is obtained.

FIGS. 3 and 4 represent the object to be protected in the form of a rectangular sheet 25 (passport page; identity card, etc.) at least one face 22 of which, referred to as a scripted face 22 and assumed to be the recto of the sheet, bears readable script 23, for example a photograph 24, common records, variable records (name, first name, address, signature, digital or optically read codes, etc.) or the like.

The format of the security film 3 is preferably designed to cover the scripted face 22 entirely. There is nothing to prevent a smaller format being provided, however, with the security film 3 covering readable script 23 only over a part of the surface of the scripted face 22.

The matching antenna 12 may be associated with the verso of the sheet 25, that is to say on its face 26 on the other side from the scripted face 22. The matching antenna is preferably selected to have a shape corresponding at least substantially to that of the sheet 25, and so as to extend close to the periphery of the face 26 of this sheet 25. This is because the large loop 15 is then as large as possible.

The microtransponder 7 is placed in the security film 3 so that it is subsequently as discreet as possible (after placement on the scripted face). Furthermore, the microtransponder 7 may be superimposed with a pattern of the scripted face, so that it merges within this pattern without being readily detectable by observation. The position of the microtransponder 7 is thus chosen so that it faces a corresponding coupling loop 14 after placement in order to ensure their relative electromagnetic coupling, that is to say in order to make it possible to read the information recorded in the memory of the microtransponder 7 via the coupling loop 14 and the matching antenna 12. It should be noted that these precise relative positions are actually obtained during the manufacture of the antenna film 10 and of the security film 3. After the readable script 23 has been formed on the scripted face 22, it is sufficient to put the two films 10, 3 in place, one 3 on the recto and the other 10 on the verso of the sheet 25, in order to ensure correct relative positioning of the microtransponder 7 vis-à-vis the coupling loop 14. The face 26 of the sheet 25 which receives the matching antenna 12 may also carry readable script 27, such as security patterns or the like. The security film 3 is put on by transfer. The nonstick sheet 9 is removed and the adhesive 8 is applied to the scripted face 22. The support sheet 2 is detached after activation of this adhesive 8. This leaves only the transparent thin film 3 formed by the two polyurethane layers 4, 5 within which microtransponder 7 is incorporated, and the adhesive layer 8. The nontransparent microtransponder 7 occupies only a very small part of the surface of the security film 3, and is therefore very discreet. The microtransponder 7 is thus incorporated between the scripted face 22 of the object and the free outer face of the security film 3.

The adhesive layer 20 of the antenna film 10 is applied to the face 26 in order to associate this antenna film, and therefore the matching antenna 12, with the sheet 25. The antenna film 10 is transparent or not depending on whether or not the support film 11 is transparent.

FIG. 5 represents an alternative embodiment in which the matching antenna 12 is incorporated within a multilayered thin film 30, for example similar to the security film 3 described above and as described by EP 0271941 or U.S. Pat. No. 5,232,527. The matching antenna 12 may be silkscreen-printed between the two continuous varnish layers of this antenna film 30, which is capable of being produced in the form of a transfer referred to as an antenna transfer 31. The antenna film 30 is printed onto the polystyrene support sheet 32. It comprises a final adhesive layer 33 which can be applied against the face 26 of the sheet 25 to be protected. The support sheet 32 may be removed after activation of the adhesive 33 and transfer.

It should be noted that (variant not shown) the format of the security film 3 and of the antenna film 10, 30 may be larger than that of the sheet 25, so that the latter is then entirely enclosed and integrated in a pouch formed between and by these two films 3, 10, 30 whose peripheral borders are adhesively bonded together.

FIG. 6 represents another variant, in which the matching antenna 12 is printed directly onto the face 26 (verso) of the sheet 25 to be protected, for example by silkscreen printing. This antenna may subsequently be covered with an optionally transparent, optionally multilayered protective film 35 optionally produced in the form of a transfer (printed onto a detachable support sheet 36 as represented in FIG. 6), which is provided with an adhesive layer 37 for adhesively bonding it onto the face 26 over the matching antenna 12 printed earlier.

As a variant (not shown) if the available space permits this, the matching antenna 12 could be printed directly onto the scripted face 22 around and beside the readable script 23. If a transparent conductive ink composition is used (incorporating a sufficient proportion of transparent conductive polymer such as BAYTRON P® marketed by BAYER AG, GERMANY or described in EP-593111 or EP-602713, in a transparent printing base) the matching antenna 12 is sufficiently transparent to permit reading through it, and it may be printed or applied so as to overlap readable script 23.

A given security film 3 may incorporate a plurality of microtransponders 7 (variant not shown). The protective device may also comprise a plurality of security films 3, if the object has a plurality of scripted faces to be protected. A plurality of power antennas 12 may be provided, for example one for each sheet of the object to be protected. Preferably, however, as represented in FIG. 7 in the case of an object in the form of a booklet 40 with a plurality of sheets 25a, 25b, 25c, 25d (for example a passport) it is possible to provide a plurality of security films 3a, 3b, 3c and a single matching antenna 12, which is provided with a plurality of coupling loops 14a, 14b, 14c that are laterally offset from one another. Each security film 3a, 3b, 3c comprises a microtransponder 7a, 7b, 7c. These microtransponders 7a, 7b, 7c are offset so as to respectively face the coupling loops 14a, 14b, 14c when the booklet 40 is closed with its sheets 25a, 25b, 25c, 25d superimposed. The matching antenna 12 is carried by an antenna film 10 applied to one of the faces of a sheet 25d, which may or may not be a cover of the booklet 40. In the example which is represented, merely for illustration purposes, the security films 3a, 3b, 3c are adhesively bonded onto scripted faces 22a, 22b, 22c oriented in the same direction. The other faces of the sheets 25a, 25b, 25c, 25d may also be scripted faces which receive a security film with one or more microtransponder(s).

A plurality of embodiments may be envisaged in respect of the microtransponder 7 and its use. The microtransponder 7 may be a memory microcircuit. Authenticating information may in this case be recorded in the memory of the microtransponder 7, preferably in an encrypted form and irreversibly, particularly in a read-only memory as is well-known per se. This recording may be carried out via the matching antenna 12 and thus be facilitated. This authenticating information may consist of some or all of the readable script 23 and/or a key and/or an algorithm for reading other information recorded in the microtransponder 7, or in a database recorded on a separate computer system. For instance, the microtransponder 7 may record digital data representing readable script and/or instructions that can be carried out by a microprocessor of the microtransponder 7 in order to perform an algorithmic calculation. As a variant or in combination, a memory of the microtransponder 7 may record digital data which represent an authenticating certificate, optionally in an encrypted form, that is to say the result of an algorithmic calculation carried out on information representing the readable script (for example a parity calculation, a CRC (cyclic redundancy check), etc.).

The microtransponder 7 may also simply consist of a hardwired logic chip (integrated logic circuit) for carrying out a specific algorithm on the basis of input data dependent on the readable script, which are delivered to it when verifying the authenticity, the result of this algorithm making it possible to authenticate the readable script.

In any event, when being read via its individual antenna, the microtransponder 7 can deliver information for authenticating the readable script.

FIG. 10 represents a diagram of a reading device 50 and of a method for using an object 25, 40 protected according to the invention. This reading device 50 comprises a power antenna 51, for example with a circular format larger than that of the object 25, 40. When the object is placed in the magnetic field of this power antenna 51, it is possible for the authenticating information delivered by each microprocessor 7 via its individual antenna and the electromagnetic coupling loop 14 of the matching antenna 12 to be read by the reading device 50, which includes suitable computing means, a keyboard 54 and a display screen 53 where the readable script 23 protected by each security film 3 can be displayed.

The power antenna 51 may be embodied on a table 52 of the reading device 50. It should be noted that owing to the matching antenna 12, the lateral positioning of the object 25, 40 with respect to the power antenna 51 does not need to be precise. The reading range (distance between the object and this power antenna 51) may furthermore be relatively large (a few millimeters or even a few centimeters) which facilitates the operations and makes them more reliable. The reading device 50 and the power antenna 51 may also be used to transmit information to each microtransponder 7 (input or control data) or to supply it with electrical energy via the matching antenna 12 and each individual antenna.

The dimensions of the matching antenna 12 are less than those of the power antenna 51, so that this matching antenna 12 can be contained in the magnetic field of the power antenna 51 when the object is placed in a reading position on the reading device. The dimensions of the matching antenna 12 are furthermore as large as possible, in view of the space available on the object, that is to say the dimensions of the face 26 to which the matching antenna 12 is applied. The matching antenna 12 has dimensions which correspond at least substantially to those of the periphery of the face 26 and in general, as in the embodiments which are represented, to those of the periphery of the scripted face 22. The matching antenna 12 has a radial dimension of more than 1 cm, typically of the order of 5 cm, while the individual antenna of a microtransponder 7 has a radial dimension of less than 5 mm, typically of the order of 2 mm, and the power antenna 51 of a reading device 50 has radial dimensions of more than 5 cm, typically of the order of 10 cm to 20 cm.

EXAMPLE

A security film 3 comprising a microtransponder, and an antenna film 10 were formed with the materials and values given in the table below:

|  |  | Printing or material composition | Dimensions (mm) |
|---|---|---|---|
| SECURITY FILM: |  |  |  |
| Support sheet 2: |  | ROBEX 515PH polystyrene marketed by ROYALITE PLASTICS (Italy) | 88 × 125 |
| Polyurethane layers 4, 5: |  | 2-Component polyurethane varnish S3H/M40-1 grade 77 - marketed by TIFLEX (France) | 84 × 121 |
| Adhesive layer: |  | Hot melt adhesive No 2-ADTH21 - Mesh 51 - marketed by TIFLEX (France) | 84 × 121 |
| Microtransponder: |  | ICL-LINK ® PICOPASS ® 2 kbits or 16 kbits marketed by INSIDE TECHNOLOGIES (France) | 2 × 2 × 0.180 |
| ANTENNA FILM: |  |  |  |
| support sheet 11: |  | 50 µm VIFS1 treated polyester marketed by REXOR (France) | 88 × 125 |
| Matching antenna 12: | Conductive ink 1 | Silver ink ref. 5028 - Mesh 77 marketed by Dupont de Nemours (USA) | 82 × 119 |
|  | Insulating varnish | UVIPRIM CV cutting base - Mesh 120 - marketed by TIFLEX (France) | 83 × 120 |
| Adhesive: |  | Hot melt adhesive No 2-ADTH21 - Mesh 51 - marketed by TIFLEX (France) | 88 × 125 |

The films are applied as represented in FIG. 4 to the recto and verso of a page of a passport. Information could be recorded in the memory of the microtransponder 7 and re-read easily with a device as represented in FIG. 10.

The invention may be the subject of a large number of variants in relation to the embodiments described above purely by way of nonlimiting examples. In particular, the format of the films 3, 10, 30 may be nonrectangular (square, polygonal, rounded, oval, circular, etc.); the shape of the matching antenna 12 may be nonrectangular; the layers forming the films may be varnishes other than polyurethanes, in particular of the acrylic type or the like; the number of power antenna(s) 12 and microtransponder(s) 7 per object (sheet or booklet, etc.) or per film 3, 10, 30 may be other than 1; the electromagnetic coupling zones 14 may be of any shape other than square loops (circular, polygonal, chicane, sinuous as described by EP 0826190, U.S. Pat. No. 5,955,723, etc.) so long as this shape is favorable for the electromagnetic coupling. A coupling zone may also be formed simply by a corner or a portion of the matching antenna 12 where the curvature is large, corresponding to the curvature of the individual antenna of a microtransponder 7. The films and printing may be formed other than by silkscreen printing (heliography, offset, smooth-cut, inkjet, etc.).

The invention claimed is:

1. A method for protecting readable script formed on at least one face of an object, referred to as a scripted face, comprising:
   covering readable script on at least one scripted face of the object with a transparent protective film, which adheres to the scripted face, and the object is associated with at least one microcircuit having at least one antenna for contactless remote reading of authenticating information, which can be delivered by this microcircuit and is designed to permit authentication of at least some of the readable script,
   wherein:
   the object is associated with at least one antenna referred to as a matching antenna, formed by printing on a support, this matching antenna having at least one zone for electromagnetic coupling with an individual antenna whose dimensions are smaller than those of the matching antenna,
   at least one transparent protective film referred to as a security film is employed, which does not carry a matching antenna but carries at least one microcircuit with an integrated individual antenna, referred to as a microtransponder, at a predetermined position so that after the security film has been placed on the scripted face of the object, and for at least one position or state of the object:
   the microtransponder permits electromagnetic coupling of the individual antenna with an electromagnetic coupling zone of a matching antenna associated with the object,
   the microtransponder does not mask any essential part of the readable script,
   a security film is applied and adhered to a corresponding scripted face in order to cover readable script and so as to permit electromagnetic coupling of the individual antenna of each microtransponder with a coupling zone and a matching antenna, for at least one position or state of the object, the matching antenna having dimensions designed to permit the remote transmission of information between the individual antenna and a power antenna of a reading device when the object is placed in the field of this power antenna.

2. The method as claimed in claim 1, wherein at least one matching antenna is printed on a printing support which is not a security film carrying at least one microtransponder.

3. The method as claimed in claim 1, wherein at least one matching antenna is printed on a face of the object.

4. The method as claimed in claim 3 wherein the matching antenna is subsequently covered with a protective film.

5. The method as claimed in claim 1, wherein at least one matching antenna is printed on the scripted face before applying a security film to the scripted face.

6. The method as claimed in claim 1, wherein at least one matching antenna is printed on a face of the object which is not a scripted face.

7. The method as claimed in claim 1, wherein at least one matching antenna carried by a film of synthetic material referred to as an antenna film is employed, and this antenna film is adhered to a face of the object.

8. The method as claimed in claim 7, wherein the antenna film is applied and adhered to a face of the object which is not the scripted face.

9. The method as claimed in claim 8, wherein the antenna film is applied and adhered to a face of the object which is the verso of a sheet of the object whose recto is the scripted face.

10. The method as claimed in claim 7, wherein at least one transfer referred to as an antenna transfer is employed, comprising a support sheet carrying an adhesive antenna film, this antenna transfer being designed to apply and adhere the antenna film to a face of the object by separating the antenna film from the support sheet.

11. The method as claimed in claim 1, wherein at least one matching antenna is employed that is printed with an ink which is transparent to visible light and electrically conductive after drying.

12. The method as claimed in claim 1, wherein at least one matching antenna comprising an electrical capacitor of adjustable value is employed.

13. The method as claimed in claim 1, wherein at least one matching antenna is employed which forms a resonant electrical circuit comprising an electrical capacitor incorporated in a graphic pattern of the antenna film and/or of the object, or superimposed with the pattern.

14. The method as claimed in claim 1, wherein at least one matching antenna printed by silkscreen printing is employed.

15. The method as claimed in claim 1, wherein at least one given matching antenna is employed comprising a plurality of electromagnetic coupling zones for coupling the matching antenna with a plurality of individual antennas of a plurality of microtransponders.

16. The method as claimed in claim 1, wherein a plurality of security films each comprising at least one microtransponder are employed for the protection of readable script on a plurality of scripted faces of the object.

17. The method as claimed in claim 1, wherein at least one security film comprising at least one microtransponder incorporated in the thickness of the security film is employed.

18. The method as claimed in claim 1, wherein at least one multilayered security film is employed.

19. The method as claimed in claim 1, wherein at least one security film formed by printing is employed, incorporating at least one microtransponder in the thickness of the security film when the security film is being formed by printing, between two printed layers.

20. The method as claimed in claim 1, wherein at least one security film formed by silkscreen printing is employed.

21. The method as claimed in claim 1, wherein at least one transfer referred to as a protection transfer is employed, comprising a support sheet carrying an adhesive security film, this protection transfer being designed to apply and adhere the security film to a scripted face of the object by separating the security film from the support sheet.

22. The method as claimed in claim 1, wherein information for authenticating at least some of the readable script is recorded in at least one memory of at least one microtransponder carried by at least one security film covering this readable script.

23. The method as claimed in claim 1, wherein authenticating information which represents a key and/or an algorithm for authentication and/or a certificate resulting from an algorithm is recorded in at least one memory of at least one microtransponder carried by at least one security film covering readable script.

24. The method as claimed in claim 1, wherein at least one microtransponder forming a logic circuit is employed.

25. A device for protecting readable script formed on at least one face of an object, referred to as a scripted face, comprising:

at least one transparent protective film adapted to adhere to the scripted face while covering readable script, and at least one microcircuit associated with the object, having at least one antenna for contactless remote reading of authenticating information, which can be delivered by the microcircuit and is designed to permit authentication of at least some of the readable script, wherein the microcircuit comprises:

at least one antenna associated with the object, referred to as a matching antenna, formed by printing on a support and having at least one zone for electromagnetic coupling with an individual antenna whose dimensions are smaller than those of the matching antenna, at least one transparent protective film referred to as a security film, which does not carry a matching antenna but carries at least one microcircuit and with an integrated individual antenna, referred to as a microtransponder, at a predetermined position so that after the security film has been placed on the scripted face of the object, and for at least one position or state of the object:

the microtransponder permits electromagnetic coupling of the individual antenna with an electromagnetic coupling zone of a matching antenna associated with the object, the microtransponder does not mask any essential part of the readable script, and wherein the matching antenna has dimensions designed to permit the remote transmission of information between the individual antenna and a power antenna of a reading device when the object is placed in the field of this power antenna.

26. The device as claimed in claim 25, wherein at least one matching antenna is printed on a printing support which is not a security film carrying at least one microtransponder.

27. The device as claimed in claim 25, wherein at least one matching antenna is printed on a face of the object.

28. The device as claimed in claim 27, wherein the device further comprises at least one protective film designed to cover at least one printed matching antenna.

29. The device as claimed in claim 25, wherein at least one matching antenna is printed on the scripted face.

30. The device as claimed in claim 25, wherein at least one matching antenna is printed on a face of the object which is not the scripted face.

31. The device as claimed in claim 25, wherein the device further comprises at least one film of synthetic material referred to as an antenna film, which carries at least one printed matching antenna.

32. The device as claimed in claim 31, wherein the device further comprises at least one transfer referred to as an antenna transfer, comprising a support sheet carrying an adhesive antenna film, this antenna transfer being designed to apply and adhere the antenna film to a face of the object by separating the antenna film from the support sheet.

33. The device as claimed in claim 25, wherein at least one matching antenna is printed with an ink which is transparent to visible light and electrically conductive after drying.

34. The device as claimed in claim 25, wherein at least one matching antenna comprises an electrical capacitor of adjustable value.

35. The device as claimed in claim 25, wherein at least one matching antenna forms a resonant electrical circuit comprising an electrical capacitor incorporated in a graphic pattern of the antenna film and/or of the object, or superimposed with such a pattern.

36. The device as claimed in claim 25, wherein the device further comprises at least one given matching antenna comprising a plurality of electromagnetic coupling zones for coupling the device with a plurality of individual antennas of a plurality of microtransponders.

37. The device as claimed in claim 25, wherein the device further comprises a plurality of security films each comprising at least one microtransponder for the protection of readable script on a plurality of scripted faces of the object.

38. The device as claimed in claim 25, wherein at least one security film comprises at least one microtransponder incorporated in the thickness of the security film.

39. The device as claimed in claim 25, wherein at least one security film is multilayered.

40. The device as claimed in claim 25, wherein at least one security film is formed by printing and incorporates at least one microtransponder in its thickness, between two printed layers.

41. The device as claimed in claim 25, wherein each microtransponder incorporated in a security film has a thickness of less than 0.2 mm and an area of less than 10 mm 2 in the plane of the security film.

42. The device as claimed in claim 25, wherein each microtransponder incorporated in a security film has a thickness of between 50 p and 180 p.

43. The device as claimed in claim 25, wherein the device further comprises at least one transfer referred to as a protection transfer, comprising a support sheet carrying an adhesive security film, this protection transfer being designed to make it possible to apply and adhere the security film to a scripted face of the object by separating the security film from the support sheet.

44. An object comprising at least one face referred to as a scripted face on which readable script is formed, wherein the object further comprises:

at least one matching antenna formed by printing on a support and associated with the object, this matching antenna having at least one zone for electromagnetic coupling with an individual antenna whose dimensions are smaller than those of the matching antenna, at least one security film which does not carry a matching antenna but carries at least one microcircuit and with an integrated individual antenna, referred to as a microtransponder, the security film being applied and adhering to the scripted face in order to cover readable script, the position of each microtransponder being designed so as to permit electromagnetic coupling of the individual antenna of each microtransponder with a coupling zone of a matching antenna, for at least one position or state of the object, the matching antenna having dimensions designed to permit the remote transmission of information between the individual antenna and a power antenna of a reading device when the object is placed in the field of this power antenna, and wherein at least one microtransponder of a security film covering readable script is designed to be able to deliver information for authenticating at least some of the readable script.

* * * * *